United States Patent Office 3,500,658
Patented Mar. 17, 1970

3,500,658
FLEXIBLE COUPLINGS
Edward W. Goody, Weybridge, Surrey, England,
assignor to Turboflex Limited
Filed Mar. 13, 1968, Ser. No. 712,717
Claims priority, application Great Britain, Mar. 15, 1967,
12,267/67
Int. Cl. F16d 3/78
U.S. Cl. 64—13       4 Claims

ABSTRACT OF THE DISCLOSURE

A flexible coupling for transmitting rotational drive comprising two components which are coupled together by flexible links of resilient material the links being connected respectively to the each component at points lying on a pitch circle about the axis of rotation of the components and one components being provided with a retaining part or parts co-axial with the axis of rotation and arranged within the pitch circle diameter of the connection points of the flexible links to that components, the retaining part circumferentially over-lapping a co-operating axially extending inner part carried on the other component.

---

Figure 1:
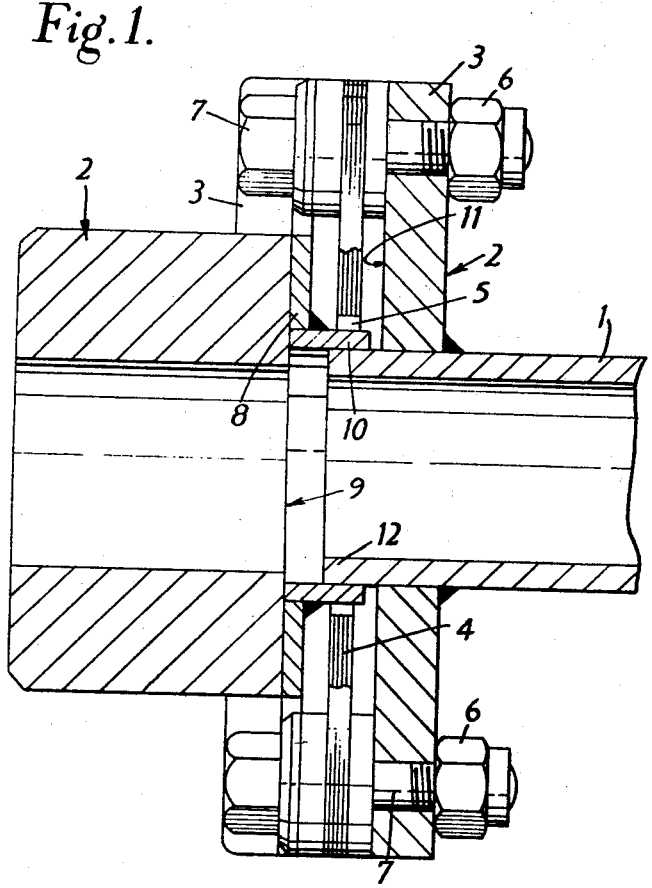

This invention relates to flexible couplings for transmitting rotational drive and is particularly concerned with couplings of the kind comprising two components which are coupled together by links of resilient material, the links being connected respectively to each component at points lying on a pitch circle about the axis of rotation of the components.

The term "links" is used herein to describe not only straight flexible members but also flexible connection elements which are in the form of a frame having an appropriate number of sides and which may be made up from a number of laminations.

In the applicant's British Patent No. 1,084,956, a coupling of the kind set forth is described which is provided with means for preventing one of the components from flying outwardly with respect to the other component in the event of a complete fracture of the drive connection between the two components, and the present invention can be employed to prevent misalignment in such a coupling caused by unequal yield in the material of the links.

A link fracture of the kind referred to can, of course, result when the coupling is overloaded and the resilient links and their respective connections fail.

According to the present invention, a flexible coupling for transmitting rotational drive comprises two components which are coupled together by flexible links of resilient material, the links being connected respectively to each component at points lying on a pitch circle about the axis of rotation of the components and one component being provided with a retaining part or parts coaxial with the axis of rotation and arranged within the pitch circle diameter of the connection points of the flexible links to that component, the retaining part circumferentially overlapping a co-operating axially extending inner part carried on the other component.

Preferably, the retaining part is provided by an axially extending flange which projects from the end of one of the components and the flange may be carried by an annulus attached to the component.

The inner part may also be provided by an axially extending flange which projects from one end of its associated component and the flange which provides the inner part may be carried by an annulus attached to the associated component.

In another arrangement, the component may comprise a hub connected to a tube, the tube projecting from the hub to provide the flange which forms the inner part In the manner set forth above, the two components will be retained from flying outwards in the event of a flexible link failure.

The arrangement set forth above can also be incorporated in constructions in which the coupling is made between a pair of components, one of which is in the form of a spacer provided with flexible couplings at each of its ends.

In a convenient construction, the retaining part and the inner part are each formed as a flange on an annulus, each annulus being secured to its associated component by pins which also hold the flexible links in position.

With this construction, each flange preferably extends axially from its annulus in a direction towards the component to which it is connected.

It is reasonable to assume that, in the event of link failure, only one link or side of the flexible element will probably fail initially, the subsequent vibration in the joint causing failure of the others and it may, therefore, be assumed that when the first link fails, it allows a certain amount of rotation between the hubs, and according to another feature of the present invention, each annulus is provided with openings by which it is secured to the pins and with enlarged openings through which the pins secured to the other component pass with a clearance to provide an emergency drive in the event of link failure.

Thus, the amount of rotational movement which can take place is small and the coupling may continue to drive without further damage taking place prior to replacement of the damaged part.

In any case, preferably the retaining part or inner part extends through an opening within the flexible links and acts to centre them in the event of their distortion under load.

The links as used in the coupling may be of various kinds but preferably, they are formed as a unitary frame which is made up from a series of laminations of resilient metal.

Figure 2:
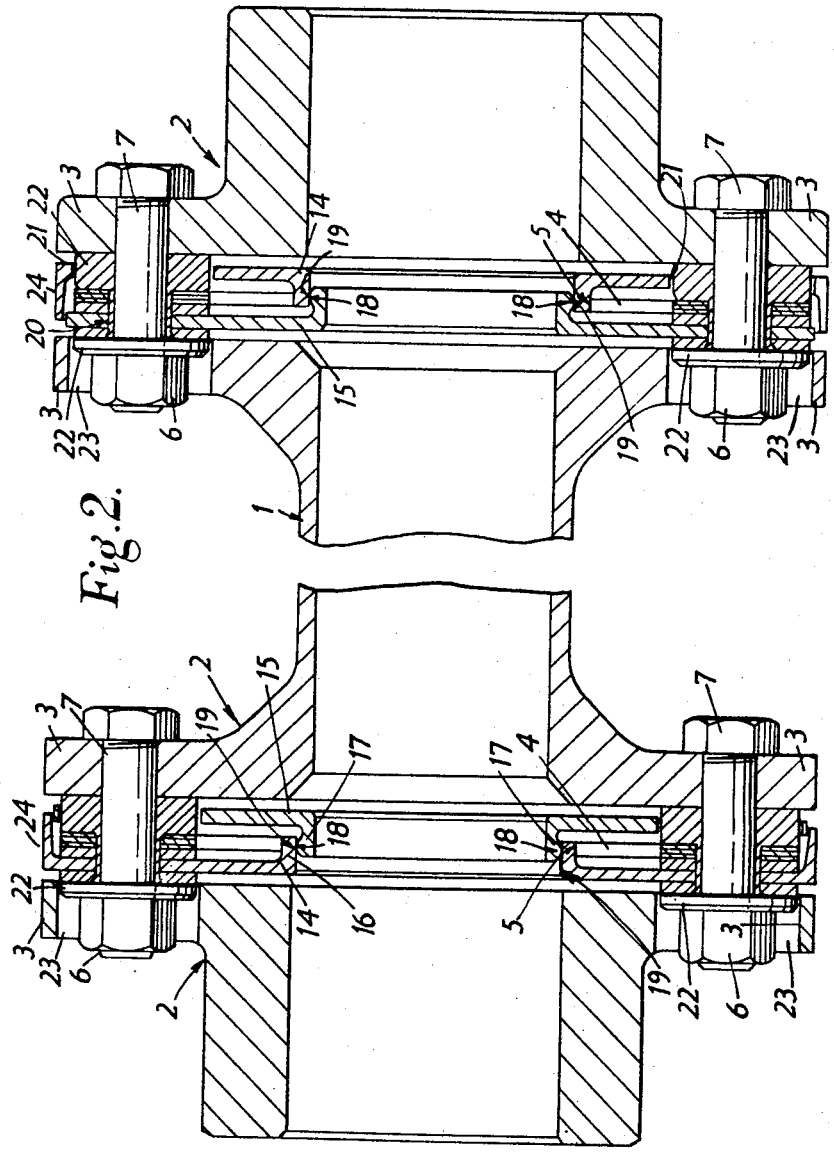

The invention may be performed in many ways, but two embodiments will now be described by way of example and with reference to the accompanying drawings, in which:

FIGURE 1 is a cross sectional side elevation of a coupling according to the invention; and FIGURE 2 is a similar view of an alternative construction.

In the first embodiment to be described and as shown in FIGURE 1, two couplings are provided at the ends of a metal spacer tube 1 which is arranged between two shafts (not shown) which are to be coupled although only one coupling is shown and will be described. Each shaft and each end of the spacer tube 1 is provided with a hub 2 which has a radially projecting flange indicated at 3 to which flexible links 4 are connected. Each of the flexible links 4 is in the form of a square frame made up from a series of laminations and having a hole at each corner and a square or circular hole 5 at its centre. Two diametrically opposed holes in the link frame 4 are connected by nuts and bolts 6, 7 to the radially projecting flanges 3 on the spacer and the other two corners are connected to the radially projecting flange on the shaft hub 2 in a similar manner, the bolts acting as drive pins. Thus, with this arrangement, the spacer tube 1 is provided with flanges 3 at each end which are in turn connected through the flexible links 4 to the hubs 2 on each of the shafts to be coupled. The flexible links 4 give the coupling its desired flexibility and the connection bolts 7 lie on a pitch circle about the axis of rotation of the coupling. A flexible coupling of the kind is described :— British Patent No. 923,141.

In each coupling a thin annular flange 8 is welded to the face 9 of the hub 2 carried by the shaft so that it is coaxial therewith and the inner edge of this annulus 8 is provided with an axially projecting flange 10. The tube 1 which forms the main part of the spacer is allowed to project axially beyond the face 11 of the radially projecting flange 3 which is connected to it and the axially projecting flange 10 thus formed, is surrounded by the radially projecting flange 10 carried by the annulus 8, a small clearance being provided between them so that there is no interference between the two parts in normal operation of the coupling. In the event of the coupling being over-stressed and the failure of the flexible links 4 or the bolts 7, the drive between the shaft and the spacer will be severed or dislocated but the spacer tube 1 and the shaft will be radially located by the axially extending retaining flange 10 carried by the annulus 8 engaging the extension 12 of the spacer tube 1 and will thus prevent the tube from flying outwardly.

In the second arrangement as shown in FIGURE 2, the same reference numerals are used to indicate similar parts. In this construction, a thin annulus 14, 15 is carried near the face of each hub 2 and is held in position by the bolts which hold the links and which provide the drive pins. Each annulus is formed with an axially projecting flange, the retaining flange 16 on annulus 14 being of larger diameter than the thinner flange 17 on annulus 15 so that they overlap. The axially extending circumferential surface 18 of the inner flange 17 is bevelled and contacts the inner axially extending surface 19 of the outer flange 16. Each annulus is provided with four holes. Two of the holes, indicated by reference numeral 20, are dimensioned to allow the bolts 7 to pass through them to hold each annulus in position and the other two holes 21 which are angularly displaced by 90° from the holes 20 are large enough to pass freely over the washer or rivet 22 which holds the laminations of the flexible frame together. It will be seen that each annulus 15, 16 is held on the bolts 7 of the hub with which it is associated at a point displaced from the end surface of that hub by being placed on the side of the flexible links 4 displaced from the hub. Each of the axially projecting flanges 16, 17, therefore, project in a direction towards the component to which the annulus is fastened.

The flanges, therefore, act to retain the coupling in radial alignment, the bevelled surface 18 on the flange 17 allowing for a relative misalignment between the hubs which is required in a flexible coupling and the outer surface of the retaining flange 16 acting to align the links in the case of unequal yield or plastic deformation during operation. The openings 21 which surround the pins to which the annulus is not connected, act to provide an emergency drive in the event of link failure, the drive taking place through the annulus concerned.

The bolts 7 which hold the links 4 in position, are provided with large washers 22 beneath the heads of the nuts 6, and the bolts 7 project into holes 23 which are provided at appropriate points in the circumferentially extending flanges 3. Thus, the nuts also assist in providing an auxiliary drive in the event of link failure and the large washers 22 which are made of non-ferrous materials such as brass or bronze, will prevent sparking taking place.

Each annulus 14 is provided with an axially extending peripheral flange 24 which assists the air flow around the joint when in use.

Although both the above arrangements have been described in relation to the couplings employing a spacer between the two shafts to be connected, they could, of course, be provided in a coupling in which the two shafts are connected directly together and it will also be appreciated that, although the above embodiments are described in relation to couplings employing two pins on each point to be coupled, they could be used with couplings employing any number which is required for the transference of the power concerned, for example, three or four or more.

What I claim is:

1. A flexible coupling for transmitting rotational drive comprising two components coupled together by a flexible coupling member formed of at least one flexible link, said coupling member being connected respectively to each component at points lying on a pitch circle about the axis of rotation of the components, said flexible coupling member having a central opening therethrough, and said components having projecting axially overlapping circumferentially cooperating alignment retaining parts disposed coaxial with the axis of rotation and extending into said flexible coupling member opening with the axial overlapping of said alignment retaining parts being coextensive with the axial extent of said flexible coupling member, whereby minimal clearances between said alignment retaining parts may be maintained, each retaining part being in the form of an annular flange on an annulus with each annulus being secured to its respective component by pins which also secure the flexible coupling member in position.

2. The flexible coupling of claim 1 wherein each annulus is positioned on the side of said flexible coupling member remote from its respective component.

3. The flexible coupling of claim 1 wherein each annulus is positioned on the side of said flexible coupling member remote from its respective component, and each annular flange projecting from its respective annulus towards its respective component.

4. The flexible coupling of claim 1 wherein each annulus is positioned on the side of said flexible coupling member remote from its respective component, and at least one annulus having openings therethrough receiving pins of the other of said components whereby in the case of failure of said resilient coupling member a temporary driving connection will exist through at least one annulus.

References Cited

UNITED STATES PATENTS

| | | | |
|---|---|---|---|
| 1,362,633 | 12/1920 | McCutcheon | 64—13 |
| 1,475,462 | 11/1923 | Turnquist | 64—13 |
| 2,251,722 | 8/1941 | Thomas | 64—13 X |
| 2,499,093 | 2/1950 | Fast | 64—13 |
| 3,250,089 | 5/1966 | Bruyere | 64—13 X |

FOREIGN PATENTS 562,241   8/1958   Canada.

HALL C. COE, Primary Examiner